Jan. 2, 1940. C. F. REIS 2,185,818
IMPULSE COUPLING
Filed Nov. 19, 1937 2 Sheets-Sheet 1
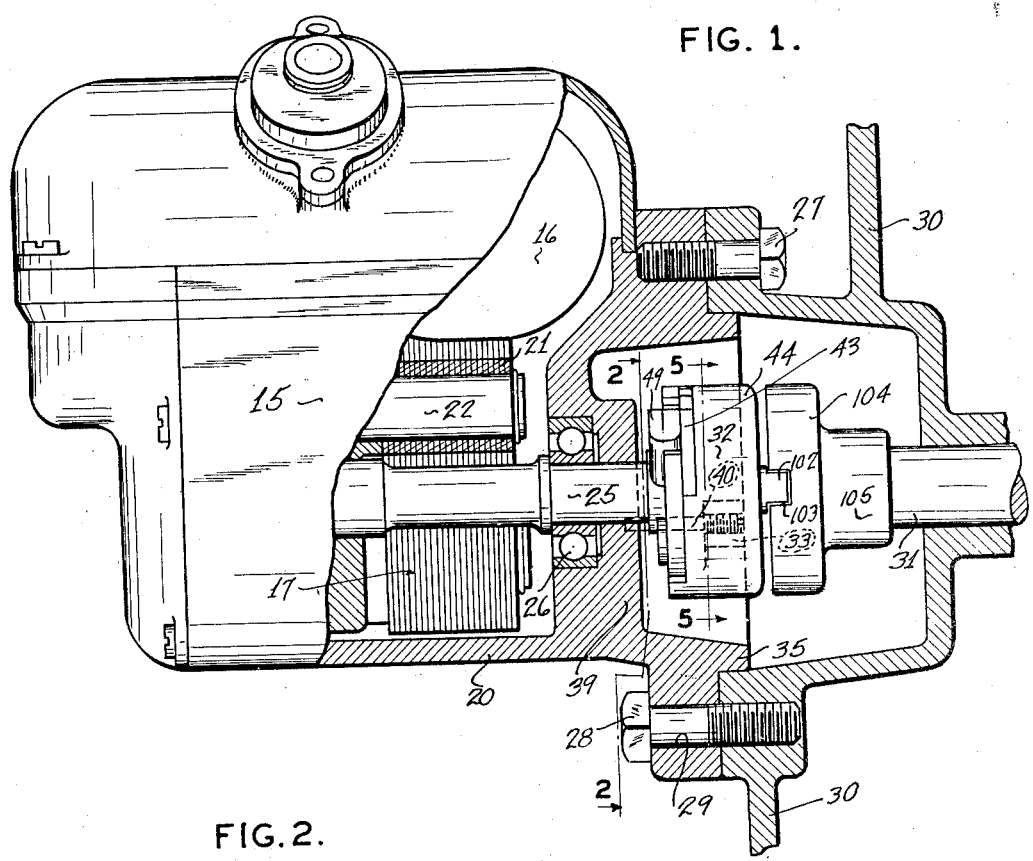
FIG. 1.
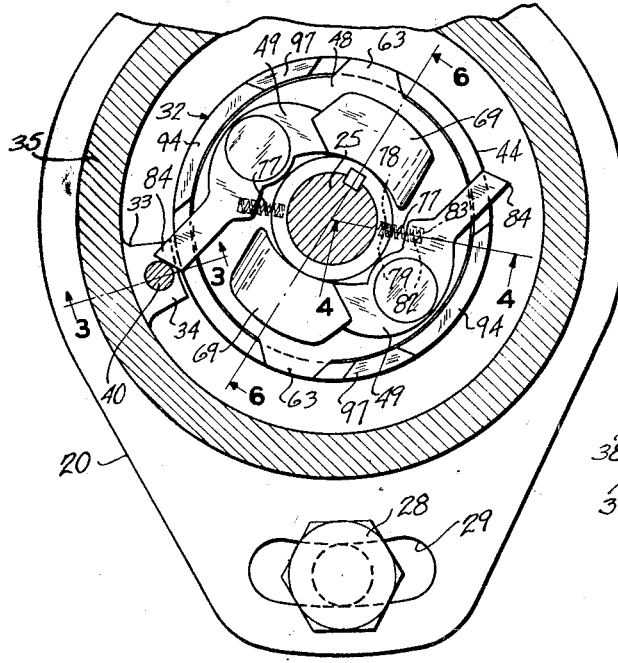
FIG. 2.
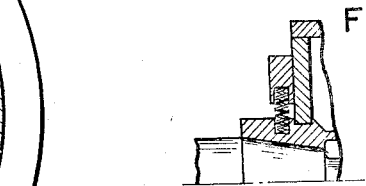
FIG. 4.
FIG. 3.
INVENTOR.
CURT F. REIS
BY
ATTORNEY.

Jan. 2, 1940.    C. F. REIS    2,185,818
IMPULSE COUPLING
Filed Nov. 19, 1937    2 Sheets-Sheet 2

INVENTOR.
CURT F. REIS
BY *Paul L. Krohn*
ATTORNEY.

Patented Jan. 2, 1940

2,185,818

UNITED STATES PATENT OFFICE 2,185,818

IMPULSE COUPLING

Curt F. Reis, Chicago, Ill., assignor to Superior Parts Manufacturing Company, New York, N. Y., a corporation of New York Application November 19, 1937, Serial No. 175,385

2 Claims. (Cl. 171—209)

This invention relates to improvements in impulse couplings adapted for use in connection with magnetos or electric generators supplying ignition current to internal combustion engines and the like.

An object of this invention is to provide a compact, positive acting impulse coupling comprised of but few parts, the parts being so formed and related as to effect a material reduction in the cost of manufacture, and to greatly enhance ability and life of the coupling.

Another object is to provide an impulse coupling of the type described, which is adapted to operate with equal facility and efficiency in either a vertical or a horizontal position, this being attained through the use of resilient means, such as springs, acting on pawls in a manner to effect a positive engagement thereof with a stationary abutment or stop member, during a stage in the impulse operation of the coupling.

Figure 5:
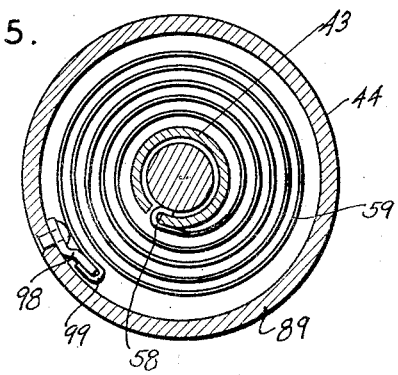
Figure 6:
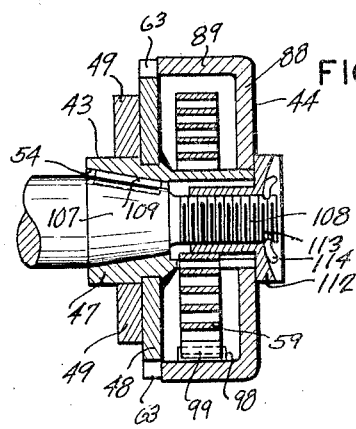
Figure 8:
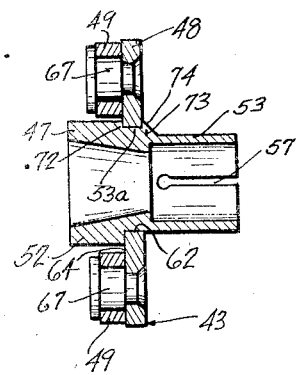
Figure 7:
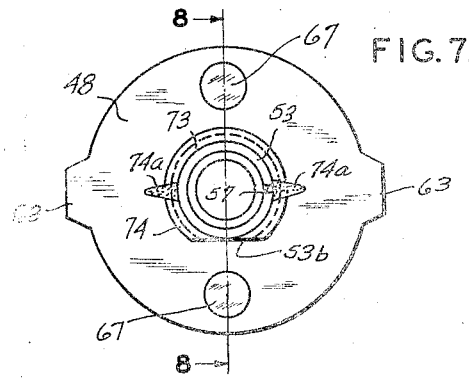
Figure 10:
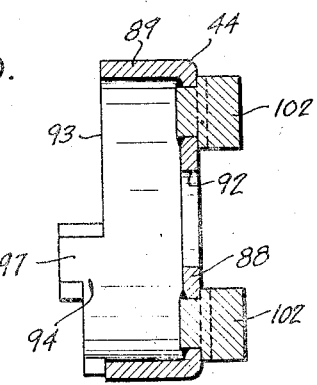
Figure 9:
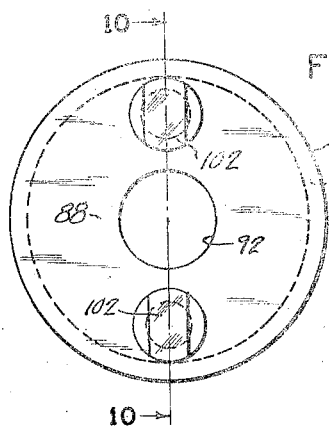
Figure 11:
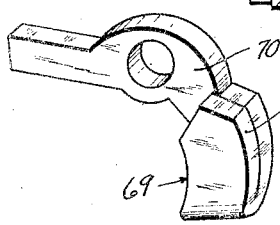

Further objects and advantages of the present invention will become apparent from the following detailed description of parts and operation, taken in connection with the accompanying drawings in which:

Fig. 1 is an assembly elevation of a magneto organization, with a portion thereof broken away to show the impulse coupling in assembled position; Fig. 2 is an enlarged fragmentary sectional elevation taken along line 2—2 in Fig. 1, showing certain details of the coupling assembly; Fig. 3 is a fragmentary sectional elevation of a portion of the coupling mechanism, as taken along line 3—3 in Fig. 2; Fig. 4 is a fragmentary sectional elevation of the mechanism as taken along line 4—4 in Fig. 2; Fig. 5 is an enlarged sectional elevation of the coupling, as taken along line 5—5 in Fig. 1; Fig. 6 is a sectional elevation taken along line 6—6 in Fig. 2, showing the coupling in operative assembly; Fig. 7 is a plan view of the driven member forming a part of the coupling mechanism; Fig. 8 is a sectional elevation of the driven member as taken along line 8—8 in Fig. 7; Fig. 9 is a plan view of the driving member of the impulse coupling; Fig. 10 is a sectional elevation of the driving member, taken along line 10—10 in Fig. 9 and Fig. 11 is a view in perspective of a modified form of pawl which may be utilized in the structure of the coupling.

Referring to the drawings by suitable numerals of reference, 15 designates generally a magneto of any well known type, including field coils 16 and an armature assembly 17 within a housing structure 20. The armature assembly 17 is comprised in part, of laminated pole shoes 21 suitably mounted upon pole pieces 22, these elements being carried by a shaft 25 journalled in bearings 26 supported within the housing 20. The magneto is suitably attached, by means of cap screws 27 and 28, to the frame 30 of an engine (not shown) with which it is operatively associated (Fig. 1). The screw 28 is fitted through a slide or slotted portion 29 formed in the housing 20, whereby any diametrical misalignment of the cap screw openings in the engine frame are taken care of. The magneto shaft 25 is arranged in substantial, axial alignment with the engine shaft 31. An operative engagement of the shafts 25 and 31 is attained by means of an improved impulse coupling 32 later to be fully described. The coupling 32 is in operative association with an abutment or catch member 33 (Figs. 1, 2 and 3) which is selectively disposed in the housing structure 20 adjacent the coupling 32 for purposes to be hereinafter noted. The member 33 is, by preference, comprised in part of a protuberance or extension 34, formed integrally with an annular flange portion 35 of the housing 20. A screw-receiving aperture 37 is located near the outer end of the protuberance 34 and is in substantial alignment with a drilled recess 38 disposed in an end portion 39 of the housing 20. A pin 40 having an enlarged threaded end 42 is adapted to be inserted through the aperture 37, and received by the recess 38 and is positively maintained in position by threaded engagement of the end 42 in the aperture 37 as is clearly shown in Fig. 3. It is thus seen (Fig. 2) that an abutment member is provided in close proximity to the periphery of the coupling 32, whereby to readily engage any part of the coupling which might be projected beyond the peripheral contour of the coupling.

The coupling 32, now to be fully described, consists of a driven member 43 and a driving member 44, the former being secured, in a manner hereinafter to be described, to the shaft 25, and the latter being in driven engagement with the engine shaft 31. The member 43 (Figs. 7 and 8) includes a hub or sleeve 47, a plate element 48 and pawls 49. The sleeve 47 is formed with integral portions 52 and 53 having respectively, large and small external diameters and internal tapered, and cylindrical bores. The portion 52 has a keyway 54 therein which serves a purpose to be noted later. The portion 53 is provided with a slot 57 to receive and lock one end 58 of a spiral spring 59 and with a collar 53a which is adjacent the portion 52 and which has a portion flattened or cut away as at 53b. The plate 48 is provided with a central aperture 62, having a flattened portion, sufficiently large to permit the collar 53a of the hub or sleeve 47 to be inserted therein, whereby the plate may be secured to the hub or sleeve 47 in a manner to be hereinafter fully described. The periphery of the plate is provided with a pair of diametrically opposed radially extending or peripheral projections 63, which serve a purpose to be hereinafter noted. One side 64 of the plate is provided with pawls 49 which are pivotally assembled on diametrically opposed pins 67. The pins are selectively disposed relative to the projections 63 and extend through the element 48 to which they are fixedly secured as by welding. In the assembly of the member 43, the plate 48 is, by preference, positioned against a shoulder 72 which is formed by the variations in the external diameters of portions 52 and 53. The plate is positively secured in that position about the sleeve 47 by spinning a projecting portion 73 of the collar 53a adjacent the plate in a manner to form a shoulder 74 lapping a face of the plate and by further welding the sleeve and plate together as at 74a.

Each pawl 49, hereinabove noted, is of a planar shape and formed from a single piece of metal stamping and is provided with a coil spring 77 which is disposed in a manner to properly actuate the pawl outwardly and into engagement with the abutment 33. A usual type pawl, a modification 76 of which is shown in Fig. 11, is seen to be formed of a single sheet metal stamping, one portion 68 of which is folded back upon itself to form a weighted arm or counterweight 69. A pawl of this type is generally utilized on impulse couplings which depend for their efficient operation upon the effect of gravity acting on the weighted portion formed on the pawl whereby to attain a properly timed engagement of the pawl with an abutment member such as 33. It is readily apparent that the efficient use of a pawl of this type is restricted to couplings assembled to operate in a horizontal position. Also the formation of the counterweight on the pawl necessitates additional pawl material and a plurality of machining operations, whereby the cost of manufacture is appreciably increased. In the present preferred construction of a coupling the proper engagement of each pawl 49 with the abutment member 33 is provided for both a horizontal and vertical position of operation of the coupling by the spring 77. The spring is arranged with one end 78 disposed in a recess 79 formed in the sleeve 47, and the other end 82 similarly disposed in a recess 83 in the pawl 49, whereby each pawl end 84 is urged outward beyond the peripheral contour of the coupling. A positive and properly timed engagement of the pawl with the catch member 33 is thus assured, for a condition of engine starting, for all positions of coupling assembly. The above noted engagement will continue to repeat itself until a coupling speed is reached at which the centrifugal effect on the portion 69 of the pawl, overcomes the force exerted by the spring 77 tending to urge the pawl into engagement with the abutment 33. The use of the spring eliminates the requirement of a counterweight structure on the pawl, whereby it may be centrifugally actuated, and thus an appreciable reduction in the cost of pawl manufacture is attained, since no additional stock is needed to form the counterweight as a result of which the pawl may be formed in a single stamping operation. However it is to be understood that a pawl with a counterweight portion may be employed in connection with the present preferred construction of an impulse coupling. Although a pair of pawls are shown in the illustration (Fig. 2), it is apparent that one pawl only may be used to produce the desired impulse action of the coupling.

The driving member 44 of the coupling is, for the purpose of production at a low manufacturing cost and to reduce the number of impulse coupling parts, formed of a single sheet metal stamping, which is drawn into a cup-shaped element having a face or flat portion 88 and a peripheral wall portion 89 (Figs. 9 and 10). The face portion 88 is formed with a central aperture 92, which is of a size sufficient to fit over the portion 53 of sleeve 47 in a manner to be hereinafter described. The peripheral wall portion 89 is, by preference, provided with recessed portions 93, which form intermediate stepped abutment portions 94. Each portion 94 is provided with a selectively disposed and integrally associated cam element 97 which serves a purpose to be hereinafter noted. A catch element 98 (Fig. 5) is suitably secured and positioned on the inner side of the wall portion 89, whereby to lockingly engage an end 99 of the spring 59 hereinabove noted, which is disposed in the chamber formed by the portions 88 and 89. A pair of diametrically opposed lugs 102 are positioned on the face 88 of the member 44 in a manner to engage companion slots or recesses 103 formed in the disc portion 104, of the member 105 which is suitably secured to an engine shaft 31 (Fig. 1). An operative engagement of the driving member with a driving means of the engine is thus attained. The lugs are, by preference, inserted through and welded to the face portion 88.

In the preferred assembly of the coupling (Fig. 6) the end 58 of the spring 59 is inserted in the slot 57 of the portion 53 of the sleeve 47, and the members 43 and 44 are moved relative to each other in a manner to place the spring 59 under an initial tension. The sleeve portion 53 of the member 43 is journalled in the aperture 92 of the member 44 concurrently with the positioning of the projections 63 of the plate 48 in the recessed portions 93 of the portion 89. The tension in the spring 59 should be regulated sufficiently to maintain the projections 63 of the plate 48 in contact with the abutments 94. The journalling of the sleeve 47 in the aperture 92 serves to maintain the driving member 44 in proper alignment with the driven member 43 and armature shaft 25, whereby to substantially prevent, during the operation of the coupling, any irregularities of impulse action caused by an improperly timed release of the pawls 49, from engagement with the stop member 33. The slidable engagement of the projections 63 in the recesses 93 serves to maintain the members 43 and 44 in a properly timed relation with respect to each other, since the extent of relative angular rotation of the member 43 with respect to the member 44, is predetermined by the length of the recessed portions 93.

The coupling 32 is mounted in an operative position on the shaft 25 (Fig. 6) by a seating of the tapered portion 52 of sleeve 47 on a corresponding tapered section 107 formed on the shaft 25, near its end 108. A key 109, fitted in the keyway 54 secures the coupling to the shaft and serves to effect a concurrent rotation of the member 43 and the shaft 25. The members 43 and 44 are maintained in an assembled position on the shaft and disposed laterally thereon, by means of a nut 112 which threadedly engages the threaded portion 113 of the armature shaft 25; the nut being locked in place on the shaft as by a cotter key 114.

In the operation of the coupling the members 43 and 44 are rotated counterclockwise (Fig. 2) in the direction of engine rotation until one of the pawls 49, which is urged outward by the spring 77 is brought into locking engagement with the abutment or stop 33. As the engagement occurs the driven member 43 is precluded from further rotation but the member 44 continues to rotate relative to the member 43 which action effects an increase in the tension of the spring 59. The tension in the spring continues to increase until the cam 97 engages the pawl near its outer end 84 in a manner to urge the pawl out of locking engagement with the abutment 33, whereby a sudden release of the pawl and hence of the member 43 is effected. At the time of release the tension of the spring is sufficiently great to throw the member 43 rapidly forward in the direction of engine rotation and at a speed in excess of the speed of the member 44. The sudden rapid movement of the member 43 thus attained provides the necessary sharp impulse to the rotor of the magneto whereby a spark is generated of an intensity suitable for a proper starting of the engine. After the engine has attained a running speed, the pawls are prevented from engaging the stop 33 by the centrifugal action on the pawl portion 87, which is sufficient to overcome the action of the springs 77 and effects an inward movement of the pawl ends 84 to a position within the peripheral contour of the impulse coupling. Since the initial tension in the spring 59 is sufficient to overcome the turning torque of the magneto armature 19, the coupling will operate as a common coupling synchronously connected between the magneto and the engine organization. It is to be noted that during the stop periods of the driven member 43, the abutments 94 formed by the opposite ends of the recesses 93, move with the driving member 43, toward the projections 63 formed on the plate 46 of the driven member. The abutments are spaced with respect to each other in a manner to permit the cam 97 to release the pawl from engagement with the stop 33, before the projection 63 engages the abutment 94. Thus a lost-motion connection is provided which serves to maintain the members 43 and 44 in a properly timed relation with respect to each other, since the extent of relative angular rotation or independent movement of the members is predetermined by the spaced relation of the abutments 94 and hence by the length of the recesses 93.

It will be readily seen that the herein described coupling consists of a minimum of parts which are easily made and assembled. Furthermore, the improved coupling is neat, compact and sturdy in construction. It will be evident that the provision of the guiding journal fit of the drive member 44 with the sleeve 47 of the driven member 43 eliminates any tendency toward eccentricity between the coupling members 43 and 44 during the impulse cycles and assures concentricity of parts which substantially prevents any improper or irregular releasing of the pawls.

An important feature is that the springs 77 not only act as a means of engagement while the magneto is in a vertical position but also assure engagement when in a horizontal position, eliminating any danger of the engine kicking or backfiring, thereby preventing injury to the operator while cranking the engine. The impulse coupling is timed to release on dead center but if the coupling fails to engage or the pawl slips off of its stop before dead center is reached, the magneto fires on full spark advance which is 30 degrees before dead center is reached and the engine kicks or is driven backward with the possibility of a broken arm for the person cranking the engine.

It will of course be understood that the present detailed description of parts and the accompanying drawings relate only to a single preferred embodiment of the present invention and that substantial changes may be made in the described arrangement and construction of parts without departing from the full intended scope of the invention as defined by the appended claims.

I claim:

1. In an impulse coupling for a magneto, a cup-shaped driving member, a driven member comprised of a slotted tubular element and a circular plate element, a locking means for said driving and driven members, a stationary abutment member located adjacent said coupling, a pair of pawls pivoted in diametric opposition upon the circular element, each pawl provided with a recess, said tubular element having corresponding recesses therein, each in axial alignment with one of said pawl recesses, a spring associated with each pawl, having its ends seated in the aligned recesses in the pawl and tubular member, said springs serving to urge the corresponding pawl ends outward of the coupling periphery whereby, during impulse operation of the coupling, a positive engagement of the said pawl end with the said abutment member, will be effected for all assembly positions of the magneto.

2. In an impulse coupling for a magneto, a cup-shaped driving member, a driven member comprised of a slotted tubular element and a circular plate element, a locking means for said driving and driven members, a stationary abutment member located adjacent said coupling, a member located inwardly of the periphery of said circular element and a pin pivoting the member intermediate its ends, upon the circular element, one end portion of said pivoted member constituting a pawl adapted for engagement with said abutment member, and the other end portion projecting substantially oppositely from the pivot pin and constituting a pawl-loading means for actuating the pawl in response to centrifugal force imparted to the loading means during operation of the coupling, a recess in the pawl end of said pivoted member, located relatively adjacent said pivot pin, a corresponding recess in said tubular element in axial register with the first said recess, a spring having its ends seated in said recesses and tending to rock said pivoted member about its pivot pin in a direction to project the pawl end of the member outward of the coupling periphery, whereby, during impulse operation of the coupling, a positive engagement of the pawl with the said abutment member will be effected for all assembly positions of the magneto.

CURT F. REIS.